(12) United States Patent
Lair

(10) Patent No.: US 6,983,588 B2
(45) Date of Patent: Jan. 10, 2006

(54) TURBOFAN VARIABLE FAN NOZZLE

(75) Inventor: Jean-Pierre Lair, San Antonio, TX (US)

(73) Assignee: The NORDAM Group, Inc., Tulsa, OK (US)

(*) Notice: Subject to any disclaimer, the term of this patent is extended or adjusted under 35 U.S.C. 154(b) by 366 days.

(21) Appl. No.: 10/338,499

(22) Filed: Jan. 8, 2003

(65) Prior Publication Data

US 2005/0039437 A1 Feb. 24, 2005

Related U.S. Application Data

(60) Provisional application No. 60/346,879, filed on Jan. 9, 2002.

(51) Int. Cl.
*F02K 1/12* (2006.01)
*F02K 3/04* (2006.01)

(52) U.S. Cl. .................. 60/226.1; 60/711; 239/265.33

(58) Field of Classification Search .... 60/226.1–226.3, 60/721; 239/265.33, 265.37, 265.43
See application file for complete search history.

(56) References Cited

U.S. PATENT DOCUMENTS

| | | | |
|---|---|---|---|
| 3,892,358 A | | 7/1975 | Gissien |
| 3,967,443 A | * | 7/1976 | McMurtry .................. 60/226.1 |
| 4,112,677 A | * | 9/1978 | Kasmarik ................... 60/226.1 |
| 4,278,220 A | | 7/1981 | Johnston et al. |
| 4,638,631 A | * | 1/1987 | Debeneix et al. .......... 60/226.3 |
| 4,793,134 A | * | 12/1988 | Coplin et al. .............. 60/226.1 |
| 5,853,148 A | | 12/1998 | Standish et al. |

\* cited by examiner

Primary Examiner—Louis J Casaregola
(74) Attorney, Agent, or Firm—Francis L. Conte

(57) ABSTRACT

A turbofan exhaust nozzle includes a fan duct defined between a fan nacelle and core engine cowling. The duct includes an arcuate outlet at the trailing edge of the nacelle. A movable flap is disposed in a minor portion of the fan duct, with a remaining major portion of the fan duct having a constant flow area. The flap may be moved between stowed and deployed positions to locally decrease flow area inside the duct for noise attenuation.

20 Claims, 3 Drawing Sheets

TURBOFAN VARIABLE FAN NOZZLE

This application claims the benefit of U.S. Provisional Application No. 60/346,879; filed Jan. 9, 2002.

BACKGROUND OF THE INVENTION

The present invention relates generally to turbofan aircraft gas turbine engines, and, more specifically, to noise attenuation therein.

In an aircraft turbofan engine, air is pressurized in a compressor and mixed with fuel in a combustor for generating hot combustion gases which flow downstream through turbine stages that extract energy therefrom. A high pressure turbine powers the compressor, and a low pressure turbine powers a fan disposed upstream of the compressor.

The combustion gases are discharged from the core engine through an annular exhaust nozzle, and the fan air is discharged through another exhaust nozzle surrounding the core engine. The majority of propulsion thrust is provided by the pressurized fan air discharged from the fan exhaust nozzle, and remaining thrust is provided from the combustion gases discharged from the core exhaust nozzle.

The core exhaust flow is discharged from the core nozzle at high velocity and then mixes with the high velocity fan air discharged from the fan nozzle as well as with ambient air through which the engine and aircraft travel. The high velocity exhaust flow generates significant noise during operation, with additional noise being generated by the fan exhaust, as well as by the rotating components of the engine.

Turbofan aircraft engines have various designs including low bypass, high bypass, and long or short duct nacelles. And, these various designs may include various features for attenuating noise corresponding with the specific noise source. However, noise attenuation features typically add weight to the engine, and it is desirable to minimize engine weight in an aircraft turbofan engine.

Accordingly, it is desired to provide an aircraft turbofan engine with an improved fan exhaust nozzle for attenuating fan noise during takeoff operation.

BRIEF SUMMARY OF THE INVENTION

A turbofan exhaust nozzle includes a fan duct defined between a fan nacelle and core engine cowling. The duct includes an arcuate outlet at the trailing edge of the nacelle. A movable flap is disposed in a minor portion of the fan duct, with a remaining major portion of the fan duct having a constant flow area. The flap may be moved between stowed and deployed positions to locally decrease flow area inside the duct for noise attenuation.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
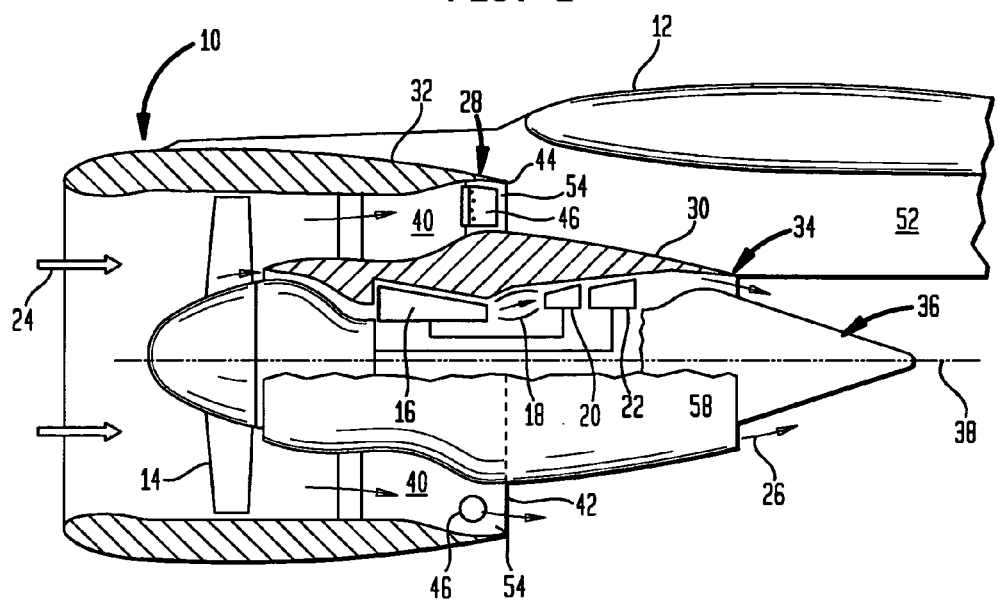
FIG. 1 is an axial sectional view through an exemplary turbofan engine mounted by a pylon to the wing of an aircraft, and including a variable area fan nozzle in accordance with an exemplary embodiment of the present invention.

Illustrated in FIG. 1 is an exemplary turbofan aircraft gas turbine engine 10 mounted by a pylon to the wing of an aircraft 12, shown in part. The engine includes in serial flow communication a fan 14, multistage axial compressor 16, annular combustor 18, high pressure turbine 20, and low pressure turbine 22.

During operation, air 24 is pressurized in the compressor and mixed with fuel in the combustor for generating hot combustion gases 26 which flow through the high and low pressure turbines that extract energy therefrom. The high pressure turbine powers the compressor through a shaft therebetween, and the low pressure turbine powers the fan through another shaft therebetween.

The exemplary turbofan engine illustrated in FIG. 1 is in the form of a high bypass ratio engine in which most of the air pressurized by the fan bypasses the core engine itself for generating propulsion thrust. The fan air 24 is discharged from the engine through a substantially annular fan exhaust nozzle 28 defined radially between an outer shell or nacelle 30 of the core engine and a fan nacelle 32 surrounding the fan and the forward portion of the core engine. The core exhaust gases 26 are discharged from the core engine through a core exhaust nozzle 34 defined between the core nacelle 30 and a center plug 36 disposed coaxially therein around an axial centerline axis 38 of the engine and plug.

Figure 2:
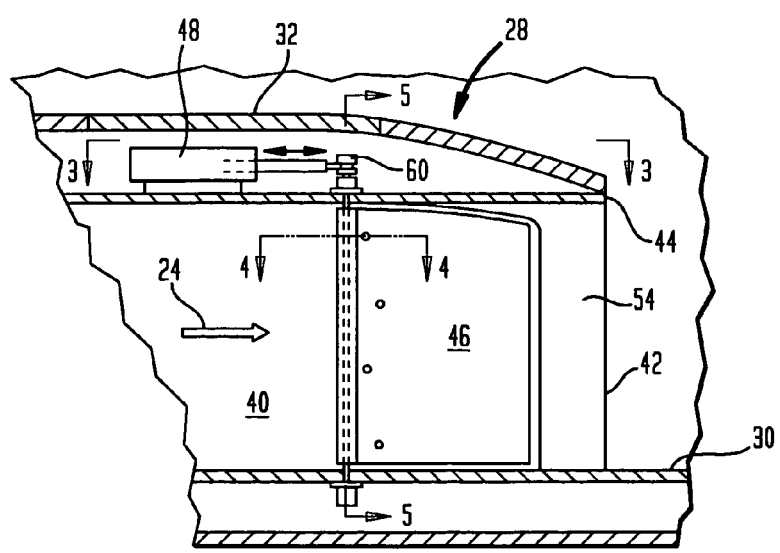
FIG. 2 is an enlarged sectional view of a portion of the variable fan nozzle illustrated in FIG. 1 in an exemplary embodiment.

The fan nozzle 28 is illustrated in more detail in FIG. 2 in which the fan nacelle 32 coaxially or concentrically surrounds the core engine cowling 30 to define a circumferentially extending fan duct 40 radially therebetween for discharging axially the fan air 24 pressurized by the upstream fan 14. As initially shown in FIG. 1, the fan duct 40 has a tubular inlet at the leading edge of the fan nacelle and an arcuate outlet 42 disposed radially between the cowling and a trailing edge 44 of the nacelle from which the fan air is discharged during operation for providing propulsion thrust to power the aircraft in flight.

In accordance with the present invention, the fan duct 40 is provided with variable area capability by integrating a movable exhaust flap 46 therein for locally changing discharge flow area of the duct. As shown in FIGS. 1 and 2, the exhaust flap 46 is preferably disposed solely in a circumferentially minor portion of the fan duct 40, with the remaining major circumferential portion of the fan duct having a fixed or constant flow area.

Conventional fan exhaust nozzles typically have constant discharge flow area and operate independently of the typical thrust reversers disposed upstream therefrom, and not shown in FIG. 1. A fan thrust reverser typically includes movable doors which are deployed into the fan duct well upstream of the nacelle trailing edge for blocking the normal aft flow of the fan air for redirection in the forward direction through cooperating louvers disposed in the fan nacelle for reversing fan thrust during landing operation of the aircraft.

As indicated above, turbofan engine noise is created by various features of the engine including the high velocity fan air discharged through the fan duct. Additional fan noise is generated by rotation of the fan 14 illustrated in FIG. 1 which has a row of fan rotor blades generating corresponding noise as a function of fan rotor speed, typically referred to as N1 speed. In some types of turbofan engines noise generated during takeoff is particularly attributable to the fan rotor speed, with the noise generated by the velocity of the fan discharge air generating a different form of noise.

In accordance with one embodiment of the present invention, a method is provided for reducing noise in the turbofan engine by temporarily decreasing discharge flow area in the fan duct 40 using the exhaust flap 46 deployed during takeoff operation of the engine in the aircraft for correspondingly reducing rotor speed of the fan 14. By operating the engine at equal takeoff thrust, local area reduction in the fan duct will cause the engine controller 50 to reduce fan rotor speed, with the air being discharged through the fan outlet having a corresponding velocity increase.

In this way, in turbofan engines sensitive to noise generation due to the fan rotor speed as opposed to the fan air discharge velocity, noise may be reduced or attenuated during takeoff by reducing fan rotor speed at the expense of increased velocity of the discharged fan air. The specific reduction in fan rotor speed may be selected so that the corresponding increase in fan discharge velocity effects a net reduction in fan generated noise during takeoff, without adversely affecting the operational characteristics of the engine.

The fan nozzle area reduction may be selectively implemented solely during aircraft takeoff to a preselected altitude during aircraft climb and then the area decrease in the fan duct may be terminated for the remaining operation of the engine, including cruise operation at high altitude for maximizing efficiency of operation.

Figure 3:
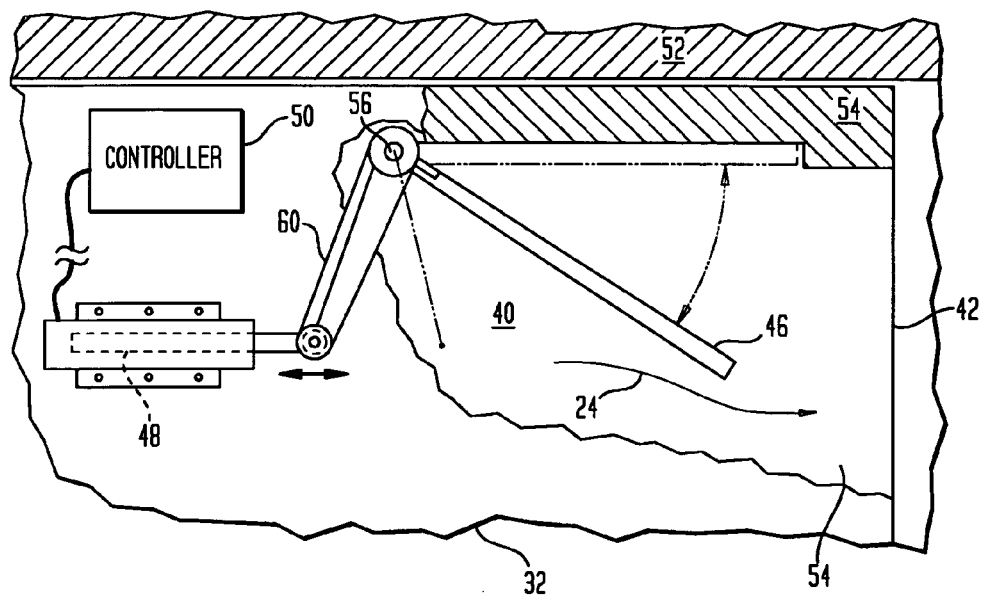
FIG. 3 is a partly sectional top view of the fan nozzle illustrated in FIG. 2 and taken along line 3—3.

As shown in FIGS. 2 and 3, the exhaust flap 46 is preferably disposed adjacent the nacelle trailing edge 44 at the fan duct outlet 42. The fan duct outlet may define a throat of minimum flow area for the fan nozzle, or the throat may be located upstream from the fan duct outlet. In this way, the flap is preferentially located for selectively decreasing the flow area of the fan duct near its outlet during takeoff operation.

Figure 4:
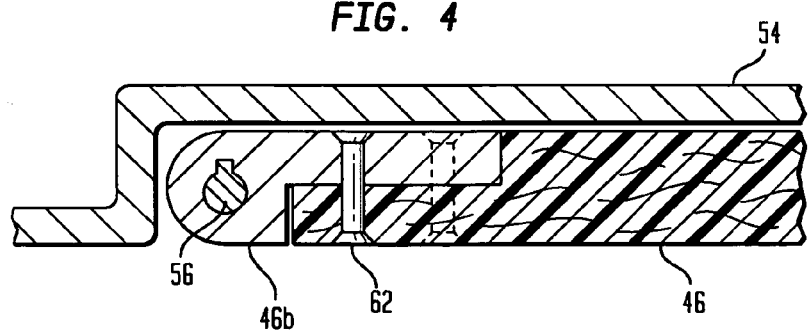
FIG. 4 is a radial sectional view through a portion of the exhaust flap illustrated in FIG. 2 and taken along line 4—4.
Figure 5:
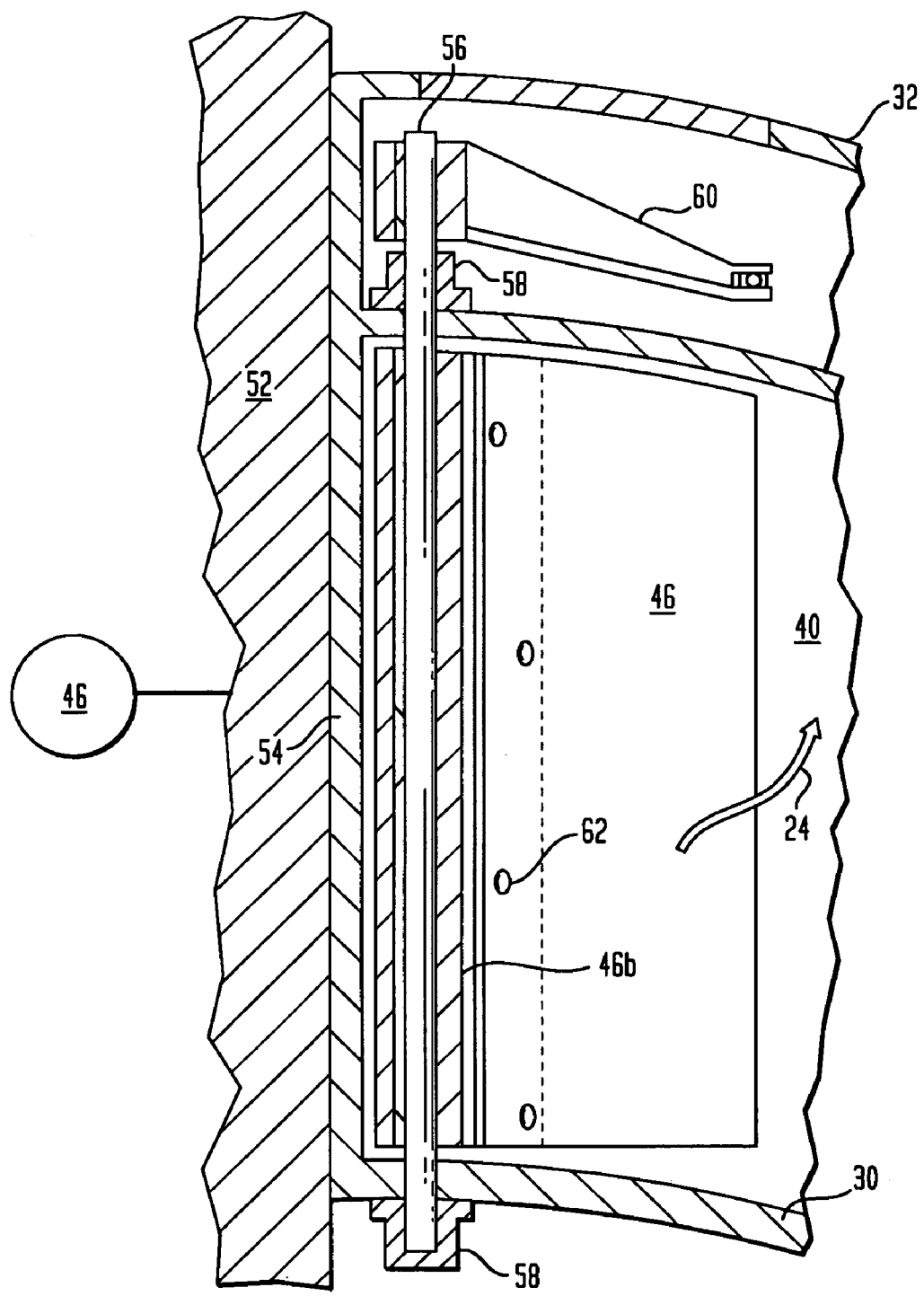
FIG. 5 is a partly sectional forward-facing-aft view of a portion of the variable fan nozzle illustrated in FIG. 2 and taken along line 5—5.

In order to move the flap 46 when desired, suitable means are provided for selectively moving the flap from a stowed position, illustrated in solid line in FIGS. 2 and 4 and in phantom line in FIG. 3, to a deployed position, illustrated in solid line in FIGS. 3 and 5, inside the fan duct. The deployed position may have any suitable angle to locally decrease discharge flow area of the duct as the fan air is discharged through the fan duct outlet when desired during takeoff. For example, the flap may be fully deployed up to about 15 degrees, or may be partially deployed at intermediate deployment angles.

In one embodiment, the flap moving means include a suitable linear actuator 48 operatively joined to the flap for selectively pivotally opening the flap to its deployed position and pivotally closing the flap to its stowed and retracted position. The actuator may have any conventional configuration such as an electro-mechanical actuator, electro-hydraulic actuator, or pneumatic actuator suitably joined to an electrical controller 50 of the engine as illustrated schematically in FIG. 3. And, the actuator preferably includes a spring to bias the flap to its stowed position.

In the typical wing mounted configuration of the turbofan engine 10 illustrated in FIG. 1, a pylon 52 structurally supports the engine at its top or twelve o'clock position to the aircraft wing. The pylon interrupts the circumferential continuity of the fan nacelle and fan discharge duct therein.

And, a bifurcating frame is also located in the engine at its bottom or six o'clock position similarly interrupting the circumferential continuity of the fan duct.

Accordingly, corresponding arcuate portions of the fan nacelle and core engine cowling on opposite lateral sides of the pylon are joined together circumferentially at opposite longitudinal endwalls 54 as shown in FIGS. 1 and 5 to bifurcate the fan nozzle downstream of the fan into a pair of C-shaped fan ducts 40 arranged in the typical or conventional configuration. Fan C-ducts are conventional and pivotally joined at their top ends to the pylon so that they may be suitably opened when desired for providing access to the engine mounted therein. As shown in FIG. 1, the top or first endwall 54 is located at the top of the engine near the pylon, and a second or bottom endwall 54 is located at the bottom of the engine. In this way, each C-shaped fan duct 40 is defined radially between the corresponding skins of the fan nacelle and core cowling, and laterally or circumferentially between the opposite longitudinal endwalls 54 at the top and the bottom of the engine.

As shown in FIG. 5, the exhaust flap 46 may be pivotally mounted in the top endwall 54 near the pylon 52 for deployment circumferentially or laterally outwardly from the pylon into the corresponding end of the C-duct 40.

As shown in FIGS. 3 and 4, the endwall 54 preferably includes a local recess specifically configured for storing the flap 46 flush in the endwall when stowed for ensuring an aerodynamically smooth integration of the flap in the endwall when not deployed. In this way, the fan duct may be substantially identical in configuration and flow area to a turbofan engine without the flaps incorporated therein for providing the intended or design operation thereof.

However, when the flap is desired for takeoff operation, it may be conveniently pivoted outwardly from the endwall when deployed. In the preferred embodiment illustrated in FIGS. 1 and 5, the flaps 46 are provided in pairs corresponding with the two C-ducts 40, one located inboard closest to the aircraft fuselage and the other located outboard facing away from the fuselage.

The two flaps may be located in the corresponding top endwalls at the pylon 52, or alternatively may be located in the endwalls at the bottom of the engine, or yet in another embodiment four flaps may be located at all four locations corresponding with the four endwalls of the two fan ducts. Since the flaps 46 and their actuating means may be substantially identical in configuration and operation, the alternate locations of the flaps 46 are indicated schematically by the circles in FIGS. 1 and 5 for simplicity of presentation.

As shown in FIGS. 4 and 5, each flap 46 preferably includes an integral hinge pin 56 at the upstream or proximal end of the flap for pivoting the opposite downstream or distal end of the flap outwardly from its mounting endwall. The flap moving means are correspondingly configured for pivoting each flap on the hinge pin between the stowed and deployed positions.

In a preferred embodiment, the hinge pin 56 is fixedly joined to its flap 46 by integral locking keys, for example. The pin itself may be generally cylindrical, with integral keys or lateral extensions thereof forming a generally keyhole-shaped outer profile. In this way, the pin may be integrally locked in a correspondingly shaped keyhole aperture in the flap for transmitting torque between the pin and flap during operation.

As shown in FIG. 5, each hinge pin 56 has opposite vertical ends pivotally joined to the outer nacelle 32 and inner cowling 30 by suitable bearings or bushings 58. The nacelle and cowling are typically formed of thin sheet metal or composite skins which provide flow boundaries for the C-ducts 40. And, the fan nacelle 32 typically includes an exposed outer skin spaced radially outwardly from its inner skin in which the upper end of the hinge pin 56 may be conveniently located.

The moving means for each flap preferably also include a control or link arm 60 shown in FIGS. 3 and 5 fixedly joined to the upper end of the corresponding hinge pin, using a similar integral locking key therein. The actuator 48 illustrated in FIG. 3 includes an extendable actuator rod having a distal end suitably mounted to the distal end of the link arm 60 using a typical spherical bearing or uni-ball configuration.

By suitably driving the actuator to extend its rod, the link arm 60 may be pivoted counterclockwise in FIG. 3 for pivoting counterclockwise the flap 46 to its stowed position within the recess of the endwall 54. Correspondingly, by retracting its actuator rod, the actuator pivots the link arm 60 clockwise in FIG. 3 for correspondingly pivoting clockwise the flap 46 into its deployed position locally blocking a portion of the available flow area within the fan duct.

In this way, each of the two or more fan exhaust flaps 46 may be conveniently mounted to their respective circumferential endwalls 54, and when retracted or stowed the corresponding C-ducts have their intended unobstructed flow area converging to their respective fan duct outlets. However, by simply pivoting inwardly the respective exhaust flaps 46 into the fan ducts, the circumferential extent of the fan ducts is shortened similarly on both the inboard and outboard sides of the engine for temporary discharge flow area reduction. The rotor speed of the fan is correspondingly forced to decrease due to the lower available flow area in the fan ducts, with a corresponding reduction in noise from the reduced fan speed.

A particular advantage of using pairs of the fan exhaust flaps 46 in the corresponding C-ducts is their simplicity of construction and operation, and their ability to maintain circumferential uniformity on opposite sides of the engine for ensuring balanced operation of the fan ducts. Each of the fan C-ducts 40 maintains its C-shape from top to bottom of the engine, with corresponding arcuate C-outlets 42 disposed radially between the core engine cowling 30 and the trailing edge 44 of the surrounding fan nacelle. The exhaust flaps 46 thusly affect only a relatively minor portion of the circumferential extent of the corresponding fan ducts for reducing flow area therein, with the remaining major circumferential portions of the fan ducts having their intended constant flow area without obstruction.

The controller 50 illustrated schematically in FIG. 3 may have any conventional configuration and is suitably joined to each of the respective actuators 48 used for pivoting the respective exhaust flaps. The controller 50 may therefore be configured, for example with suitable control algorithms, to deploy the respective flaps 46 into the fan duct 40 solely during takeoff operation of the turbofan engine up to a predetermined climb altitude. In this way, the total flow area of the C-ducts 40 is temporarily reduced during aircraft takeoff operation of the engine.

The controller 50 may then be further configured to stow or retract the respective exhaust flaps 46 into their flush stowed positions in the respective endwalls 54 during cruise operation of the turbofan engine at a predetermined or suitable altitude above sea level. The fan nozzle therefore will operate with maximum efficiency at cruise as intended by design, without any obstruction in its outlet.

The engine controller 50 is further configured for normal operation of the turbofan engine from takeoff, to maximum power, to cruise, and to landing operation of the aircraft. And, at takeoff operation of the engine the controller operates the engine for achieving an intended rotor speed for the fan 14 for obtaining corresponding takeoff thrust from the engine, primarily provided by the pressurized air discharged through the fan duct 40.

By temporarily decreasing the discharge flow area in the fan duct 40 by deploying the exhaust flaps 46, the engine controller will correspondingly reduce the rotor speed of the fan, without reducing thrust generated by the fan air. The area reduction of the fan outlet permits the decrease of fan rotor speed, yet increases the velocity of the fan air being discharged through the fan outlet for maintaining the intended takeoff thrust.

Since the exhaust flaps 46 are being introduced into the fan duct through which relatively cool fan air is discharged, they may be formed of high strength, light weight material such as a composite carbon fiber material in a suitable resin matrix. To ensure long life of the hinge mechanism, each flap preferably includes a metal plate or band 46b, as shown in FIGS. 4 and 5, suitably fixedly bonded to the proximal end of the composite flap by rivets or fasteners 62 for example. In this way, the metal band 46b can include a keyhole-shaped aperture extending vertically therethrough for receiving the hinge pin 56 therein for pivotally mounting the flap in the fan duct. In an alternate embodiment, the hinge pin may be integrally formed with the metal band and extend upwardly and downwardly therefrom for being pivotally mounted in the corresponding fan nacelle and core cowling.

In view of the relative simplicity of the fan exhaust flaps 46 provided in the respective C-shaped fan ducts 40, other configurations thereof may be used for locally decreasing fan discharge flow area when desired. Fan noise may be correspondingly reduced by the resulting reduction in fan rotor speed notwithstanding the corresponding increase in discharge fan air velocity. Since fan nozzles have various configurations, various configurations of the flaps may be used therewith as desired for temporarily decreasing discharge flow area when desired. And, the flaps may be used independently of conventional fan thrust reversers and reverser doors typically found in turbofan engines.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A turbofan exhaust nozzle comprising:
   a fan nacelle surrounding a core engine cowling to define a fan duct radially therebetween for discharging fan air;
   said fan duct including an arcuate outlet disposed radially between said cowling and a trailing edge of said nacelle;
   said fan duct further including a movable flap disposed solely in a minor portion thereof, with a remaining major portion of said fan duct having a constant flow area; and
   means for selectively moving said flap from a stowed position to a deployed position inside said fan duct to locally decrease flow area inside said fan duct for discharging said fan air through said fan duct outlet.

2. An exhaust nozzle according to claim 1 wherein said flap is disposed adjacent said nacelle trailing edge for selectively decreasing flow area adjacent said fan duct outlet.

3. An exhaust nozzle according to claim 2 wherein said flap moving means are configured to deploy said flap in said fan duct during takeoff operation of a turbofan engine configured to discharge said fan air through said fan duct.

4. An exhaust nozzle according to claim 3 wherein said flap moving means are configured to stow said flap during cruise operation of said turbofan engine at a predetermined altitude.

5. An exhaust nozzle according to claim 3 wherein said flap moving means are configured to deploy said flap for reducing rotor speed of a fan in said turbofan engine without substantially reducing thrust generated by said fan air.

6. An exhaust nozzle according to claim 2 wherein:
said fan duct is configured as a C-duct having arcuate portions of said nacelle and cowling joined together at circumferentially opposite first and second endwalls; and
said flap is pivotally mounted in said first endwall for deployment circumferentially into a corresponding end of said C-duct.

7. An exhaust nozzle according to claim 6 wherein said flap is disposed flush in said first endwall when stowed, and is pivoted outwardly therefrom when deployed.

8. An exhaust nozzle according to claim 6 wherein:
said flap includes a hinge pin at an upstream proximal end thereof for pivoting an opposite downstream distal end of said flap outwardly from said first endwall; and
said flap moving means are configured for pivoting said flap on said hinge pin between said stowed and deployed positions.

9. An exhaust nozzle according to claim 8 wherein:
said hinge pin is fixedly joined to said flap and includes opposite ends pivotally joined to said nacelle and cowling; and
said flap moving means comprise a link arm affixed to one end of said pin, and an actuator operatively joined to said arm for selectively rotating said arm and hinge pin to pivot said flap between said stowed and deployed positions.

10. An exhaust nozzle according to claim 9 wherein said flap comprises a composite material having a metal band affixed thereto at said proximal end, with said band having said hinge pin affixed thereto.

11. An turbofan exhaust nozzle comprising:
a fan nacelle surrounding a core engine cowling with arcuate portions joined together at circumferentially opposite endwalls to define a pair of C-shaped fan ducts for discharging fan air therefrom;
each of said fan ducts including an arcuate outlet disposed radially between said cowling and a trailing edge of said nacelle; and
each of said fan ducts further including a flap pivotally mounted in a respective one of said endwalls for locally varying flow area in a minor portion of said fan ducts, with remaining major portions of said fan ducts having a constant flow area.

12. An exhaust nozzle according to claim 11 further comprising:
a respective hinge pin affixed to each of said flaps and including opposite ends pivotally joined to said nacelle and cowling;
a respective link arm affixed to each of said hinge pins; and
respective actuators operatively joined to each of said link arms for selectively pivoting said flaps from stowed positions adjacent said endwalls to deployed positions inside said fan ducts to locally decrease discharge flow area of said fan air.

13. An exhaust nozzle according to claim 12 wherein said flaps are disposed adjacent said nacelle trailing edge for selectively decreasing flow area adjacent said fan duct outlets.

14. An exhaust nozzle according to claim 13 wherein said flaps are disposed flush in said endwalls when stowed, and are pivoted outwardly therefrom when deployed.

15. An exhaust nozzle according to claim 14 wherein said flap hinge pins are disposed at upstream proximal ends of said flaps for pivoting opposite, downstream distal ends of said flaps outwardly from said endwalls.

16. An exhaust nozzle according to claim 15 further comprising a controller operatively joined to said actuators and configured to deploy said flaps in said fan ducts during takeoff operation of a turbofan engine configured to discharge said fan air through said fan ducts.

17. An exhaust nozzle according to claim 16 wherein said controller is further configured to stow said flaps during cruise operation of said turbofan engine at a predetermined altitude.

18. An exhaust nozzle according to claim 17 wherein said controller is configured to deploy said flaps for reducing speed of a fan in said turbofan engine without substantially reducing thrust generated by said fan air.

19. An exhaust nozzle according to claim 18 wherein each of said flaps comprises a composite material having a metal band affixed thereto at said proximal end, with said band having said hinge pin affixed thereto.

20. A method of reducing noise in a turbofan engine having a turbofan exhaust nozzle according to claim 1 comprising:
discharging fan air through said fan duct;
deploying said flap for temporarily decreasing flow area in said fan duct during takeoff operation of said engine for correspondingly reducing speed of said fan; and
terminating said area decrease at cruise operation of said engine at altitude.

* * * * *